(12) United States Patent
Baltas

(10) Patent No.: US 8,418,471 B2
(45) Date of Patent: Apr. 16, 2013

(54) GAS TURBINE ENGINE HAVING VARIABLE FLOW THROUGH A BIFURCATION HAVING AN INTAKE WITH MULTIPLE LOUVERS

(75) Inventor: Constantine Baltas, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 972 days.

(21) Appl. No.: 12/441,546

(22) PCT Filed: Oct. 12, 2006

(86) PCT No.: PCT/US2006/040251
§ 371 (c)(1),
(2), (4) Date: Mar. 17, 2009

(87) PCT Pub. No.: WO2008/045093
PCT Pub. Date: Apr. 17, 2008

(65) Prior Publication Data
US 2009/0288387 A1    Nov. 26, 2009

(51) Int. Cl.
*F02C 1/00* (2006.01)
(52) U.S. Cl.
USPC .............. 60/772; 60/226.1; 60/226.3; 60/771
(58) Field of Classification Search ................ 60/226.1, 60/226.2, 226.3, 771
See application file for complete search history.

(56) References Cited

U.S. PATENT DOCUMENTS

| | | | | |
|---|---|---|---|---|
| 2,393,713 A | * | 1/1946 | Shoults | 415/178 |
| 2,625,009 A | * | 1/1953 | Leggett et al. | 60/785 |
| 3,892,358 A | * | 7/1975 | Gisslen | 239/265.39 |
| 3,932,058 A | * | 1/1976 | Harner et al. | 416/28 |
| 4,251,987 A | * | 2/1981 | Adamson | 60/805 |
| 4,474,001 A | * | 10/1984 | Griffin et al. | 60/204 |
| 5,123,242 A | * | 6/1992 | Miller | 60/226.1 |
| 5,203,163 A | * | 4/1993 | Parsons | 60/226.1 |
| 5,275,356 A | * | 1/1994 | Bollinger et al. | 244/12.3 |
| 5,319,927 A | * | 6/1994 | Maguire | 60/226.1 |
| 5,369,954 A | * | 12/1994 | Stuart | 60/226.1 |
| 5,467,941 A | * | 11/1995 | Chee | 244/54 |
| 5,729,969 A | * | 3/1998 | Porte | 60/226.1 |
| 5,865,398 A | * | 2/1999 | Pashea et al. | 244/53 B |

(Continued)

FOREIGN PATENT DOCUMENTS

| | | |
|---|---|---|
| EP | 0469825 A2 | 2/1992 |
| EP | 0743434 A1 | 5/1996 |

(Continued)

OTHER PUBLICATIONS

Search Report and Written Opinion for PCT/US2006/040251.

(Continued)

*Primary Examiner* — William H Rodriguez
*Assistant Examiner* — Lorne Meade
(74) *Attorney, Agent, or Firm* — Carlson, Gaskey & Olds, PC

(57) ABSTRACT

A turbofan engine pylon structure has a fan variable area nozzle defined by a variable area flow system between a pylon intake and a pylon exhaust to selectively adjust a bypass flow through the pylon structure. The variable area flow system changes the physical area and geometry of a pylon nozzle exit area to manipulate the bypass flow by opening and closing an additional flow area of the variable area flow system.

22 Claims, 2 Drawing Sheets

U.S. PATENT DOCUMENTS

| | | | |
|---|---|---|---|
| 6,282,881 B1 * | 9/2001 | Beutin et al. | 60/39.08 |
| 6,751,944 B2 * | 6/2004 | Lair | 60/226.3 |
| 6,820,410 B2 * | 11/2004 | Lair | 60/204 |
| 6,983,588 B2 * | 1/2006 | Lair | 60/226.1 |
| 7,607,308 B2 * | 10/2009 | Kraft et al. | 60/785 |
| 7,765,788 B2 * | 8/2010 | Schwarz | 60/266 |
| 7,810,312 B2 * | 10/2010 | Stretton et al. | 60/266 |
| 7,861,513 B2 * | 1/2011 | Stretton | 60/226.1 |
| 7,997,061 B2 * | 8/2011 | Marche | 60/266 |
| 2008/0028763 A1 * | 2/2008 | Schwarz et al. | 60/771 |
| 2009/0178416 A1 * | 7/2009 | Migliaro et al. | 60/771 |

FOREIGN PATENT DOCUMENTS

| | | |
|---|---|---|
| FR | 2889254 | 2/2007 |
| FR | 2891313 | 3/2007 |
| GB | 2437377 | 10/2007 |

OTHER PUBLICATIONS

Notification of Transmittal of The International Preliminary Report on Patentability mailed on Jan. 27, 2009 for PCT/US2006/040251.

* cited by examiner

GAS TURBINE ENGINE HAVING VARIABLE FLOW THROUGH A BIFURCATION HAVING AN INTAKE WITH MULTIPLE LOUVERS

BACKGROUND OF THE INVENTION

The present invention relates to a gas turbine engine, and more particularly to a turbofan engine having a bifurcation which effectively varies a fan nozzle exit area by adjusting a variable area flow system within the bifurcation to selectively vary the bypass area through which bypass flow may pass.

Conventional gas turbine engines include a fan section and a core engine with the fan section having a larger diameter than that of the core engine. The fan section and the core engine are disposed in series along a longitudinal axis and are enclosed in a nacelle. An annular stream of primary airflow passes through a radially inner portion of the fan section and through the core engine to generate primary thrust.

Combustion gases are discharged from the core engine through a primary airflow path and are exhausted through a core exhaust nozzle. An annular fan flow path, disposed radially outwardly of the primary airflow path, passes through a radial outer portion between a fan nacelle and a core nacelle and is discharged through an annular fan exhaust nozzle defined at least partially by the fan nacelle and the core nacelle to generate fan thrust. A majority of propulsion thrust is provided by the pressurized fan air discharged through the fan exhaust nozzle, the remaining thrust provided from the combustion gases discharged through the core exhaust nozzle.

The fan nozzles of conventional gas turbine engines have a fixed geometry. The fixed geometry fan nozzles are a compromise suitable for take-off and landing conditions as well as for cruise conditions. Some gas turbine engines have implemented fan variable area nozzles. The fan variable area nozzle provide a smaller fan exit nozzle diameter during cruise conditions and a larger fan exit nozzle diameter during take-off and landing conditions. Existing fan variable area nozzles typically utilize relatively complex mechanisms that increase overall engine weight to the extent that the increased fuel efficiency typically associated with the use of a fan variable area nozzle may be negated.

Accordingly, it is desirable to provide an effective, lightweight fan variable area nozzle for a gas turbine engine.

SUMMARY OF THE INVENTION

A turbofan engine according to the present invention includes a pylon structure having a variable area flow system defined between a pylon intake and a pylon exhaust to selectively adjust a bypass flow. The variable area flow system changes the physical area and geometry to manipulate the thrust provided by the bypass flow by opening and closing the additional flow area of the variable area flow system.

In operation, the variable area flow system is closed to define a nominal converged cruise position for the fan nozzle exit area and is opened for other flight conditions. The variable area flow system provides an approximately 20% (twenty percent) change in the fan exit nozzle area.

The present invention therefore provides an effective, lightweight fan variable area nozzle for a gas turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
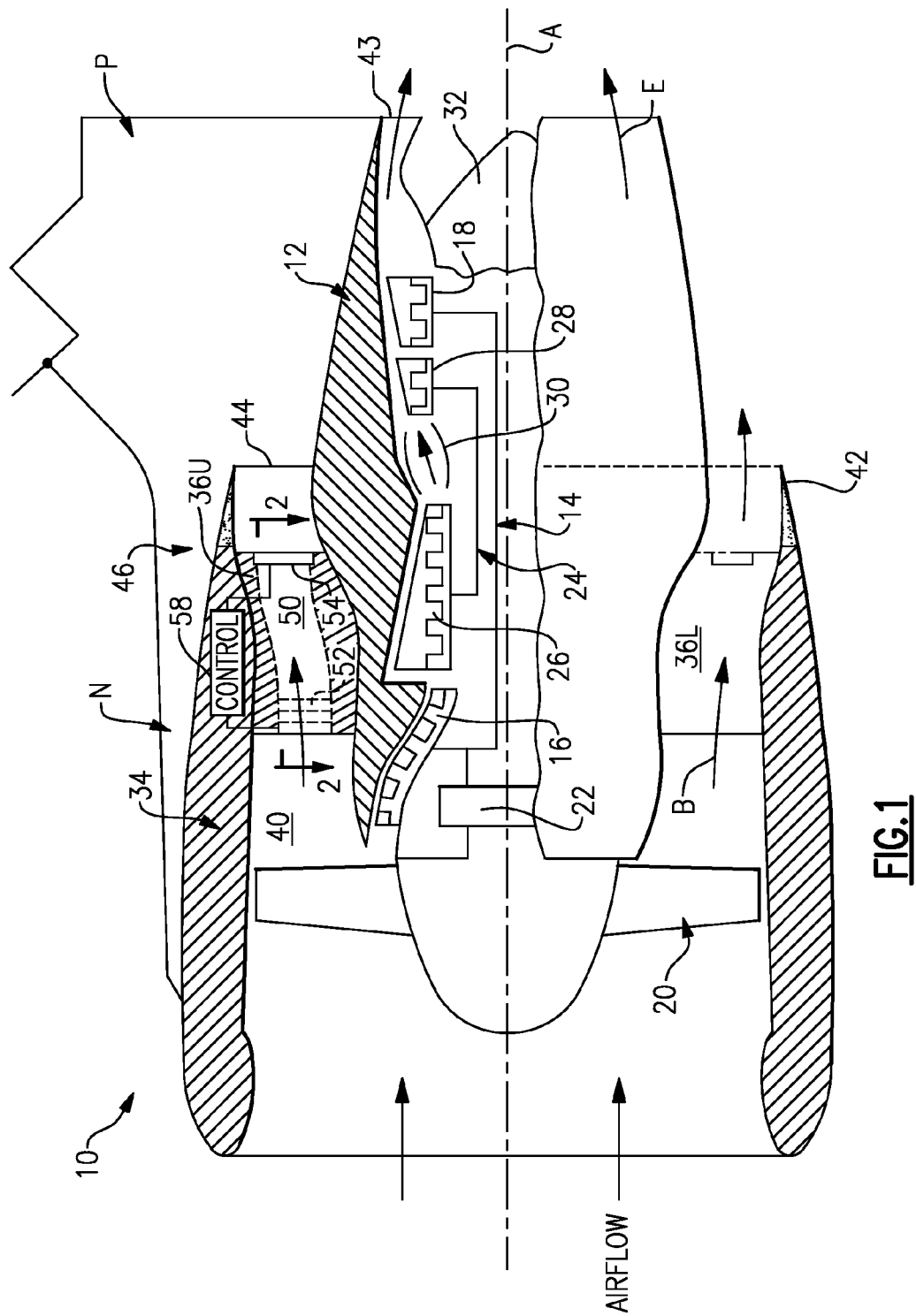
FIG. 1 is a general schematic partial fragmentary view of an exemplary gas turbine engine embodiment for use with the present invention.

FIG. 1 illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 drives a fan section 20 connected to the low spool 14 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 is preferably a high-bypass geared turbofan aircraft engine. Preferably, the engine 10 bypass ratio is greater than ten (10), the fan diameter is significantly larger than that of the low pressure compressor 16, and the low pressure turbine 18 has a pressure ratio that is greater than 5. The gear train 22 is preferably an epicyclic gear train such as a planetary gear system or other gear system with a gear reduction ratio of greater than 2.5. It should be understood, however, that the above parameters are only exemplary of a preferred geared turbofan engine and that the present invention is likewise applicable to other gas turbine engines.

Airflow enters a fan nacelle 34 which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 where is ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. The low pressure turbine 18 also drives the fan section 20 through the gear train 22. A core engine exhaust E exits the core nacelle 12 through a core nozzle 43 defined between the core nacelle 12 and a tail cone 32.

The core nacelle 12 is supported within the fan nacelle 34 by a pylon structure often generically referred to as an upper bifurcation 36U and lower bifurcation 36L, however, other types of pylons and supports at various radial locations may likewise be usable with the present invention.

A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular (circumferentially broken only by the bifurcations 36U, 36L) bypass flow path 40 and is discharged from the engine 10 through an annular fan variable area nozzle (FVAN) 42 which defines a variable fan nozzle exit area 44 between the fan nacelle 34 and the core nacelle 12. The upper bifurcation 36U and the lower bifurcation 36L, although aerodynamically optimized (best seen in FIG. 2), occupies some portion of the volume between the core nacelle 12 and the fan nacelle 34.

Thrust is a function of density, velocity, and area. One or more of these parameters can be manipulated to vary the amount and direction of thrust provided by the bypass flow B. The upper bifurcation 36U preferably includes a pylon variable area flow system 50 having a passage 56 defined between a pylon intake 52 and a pylon exhaust 54 to selectively vary the FVAN 42 area through which bypass flow B may pass. Preferably, both the pylon intake 52 and the pylon exhaust 54 are variable and controlled in response to a controller 58. It should be understood that although the upper bifurcation 36U is illustrated in the disclosed embodiment as having the pylon variable area flow passage 50, the lower bifurcation as well as other pylon structures may likewise include such variable area flow systems.

Figure 2:
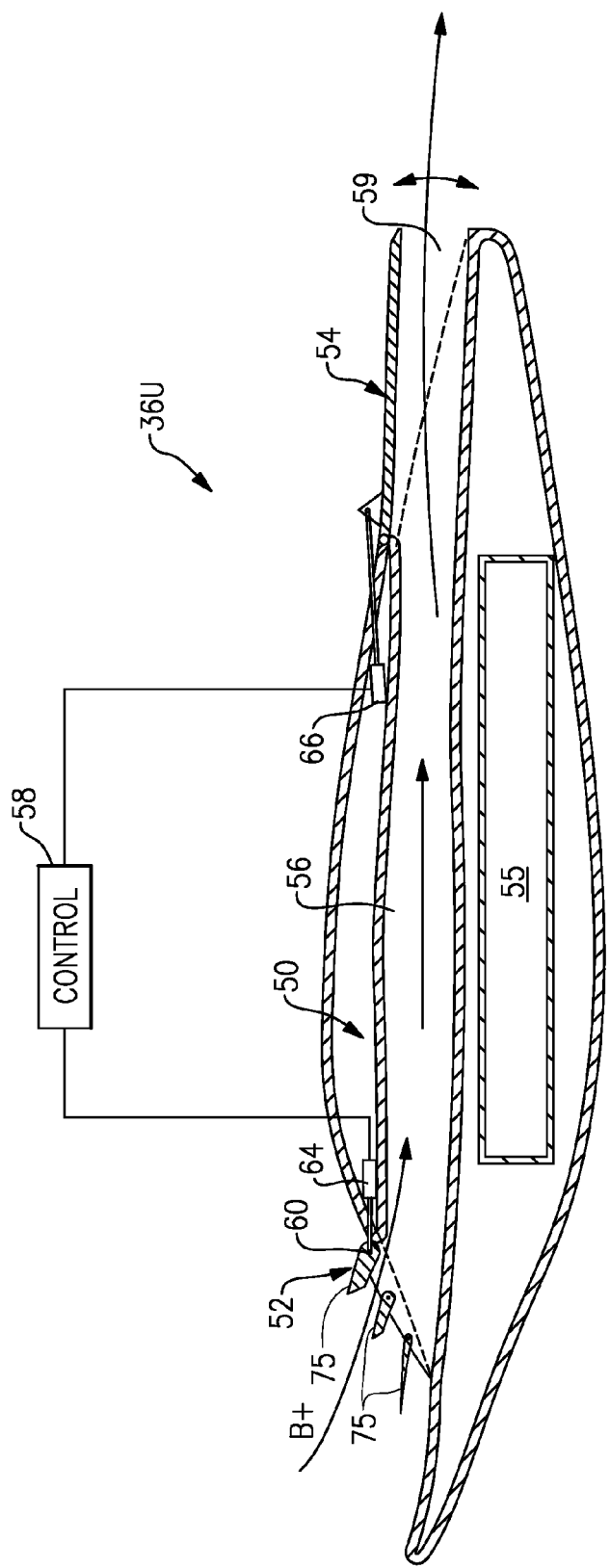
FIG. 2 is a sectional view through an engine pylon of the engine of FIG. 1 at line 2-2 to illustrate a variable area flow system.

Referring to FIG. 2, the pylon variable area flow system 50 changes the pressure ratio of the bypass flow B. That is, the nozzle exit area 44 is effectively varied in area by opening and closing the additional flow area of the pylon variable area flow system 50 to vary the bypass flow B. It should be understood that various actuators 64, 66 in communication with the controller 58 may be utilized to operate the pylon intake 52 and the pylon exhaust 54 in response to predetermined flight conditions. It should be understood that either of the pylon intake 52 and the pylon exhaust 54 may be fixed but it is preferred that both are adjustable in response to the controller 58 to control the flow area through the flow passage 56.

The flow passage 56 is defined around a component duct 55 within the upper bifurcation 36U which provides a communication path for wiring harnesses, fluid flow conduits and other components to the core nacelle 12 from, for example, the aircraft wing. It should be understood that various flow passage 56 paths will likewise be usable with the present invention.

The pylon intake 52 preferably includes an adjustable intake such as a louver system 60 with empirically-designed turning vanes 75 which most preferably have a variation of height to minimize the "shadowing" effect created by each upstream louver relative the next downstream louver.

The pylon exhaust 54 preferably includes a variable nozzle 59. The variable nozzle 59 may include doors, flaps, sleeves or other movable structure which control the volume of additional fan bypass flow B+ through the FVAN 42.

The pylon variable area flow system 50 changes the physical area through which the bypass flow B may pass. A significant amount of thrust is provided by the bypass flow B due to the high bypass ratio. The fan section 20 of the engine 10 is preferably designed for a particular flight condition—typically cruise at 0.8 MACH and 35,000 feet. It should be understood that other arrangements as well as essentially infinite intermediate positions are likewise usable with the present invention.

In operation, the pylon variable area flow system 50 communicates with the controller 58 to effectively vary the area of the fan nozzle exit area 44 through independent or coordinated operation of the pylon intake 52 and the pylon exhaust 54. Other control systems including an engine controller, a flight control computer or the like may also be usable with the present invention. As the fan blades of fan section 20 are efficiently designed at a particular fixed stagger angle for the cruise condition, the pylon variable area flow system 50 is operated to vary the area of the fan nozzle exit area 44 to adjust fan bypass air flow such that the angle of attack or incidence of the fan blades are maintained close to the design incidence at other flight conditions, such as landing and take-off as well as to meet other operational parameters such as noise level. Preferably, the pylon variable area flow system 50 is closed to define a nominal cruise position fan nozzle exit area 44 and is opened for other flight conditions. The pylon variable area flow system 50 preferably provides an approximately 20% (twenty percent) effective area change in the fan nozzle exit area 44.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of varying flow through a pylon nozzle exit area of a gas turbine engine comprising the steps of:
   (A) varying a variable area flow system in communication with a flow passage through an engine nacelle pylon to change a volume of bypass flow through the engine nacelle pylon and control flow through a pylon nozzle exit area in response to a flight condition, said variable area flow system movable toward an open position to increase flow through said pylon nozzle exit area and toward a closed position to decrease flow through said pylon nozzle exit area
   (B) having at least one bifurcation that has a variable pylon intake and a variable pylon exhaust, wherein said variable pylon intake comprises a plurality of turning vanes having variable heights relative to each other; and
   (C) forming the flow passage as an internal passage within a body of the bifurcation, with the internal passage extending from the variable pylon intake to the variable pylon exhaust.

2. A method as recited in claim 1, wherein said step (A) further comprises: opening the variable area flow system in response to a non-cruise flight condition.

3. A method as recited in claim 1, wherein said step (A) further comprises: (a) opening the variable area flow system in response to a non-cruise flight condition.

4. A method as recited in claim 1, including associating a first actuator with the variable pylon intake, associating a second actuator with the variable pylon exhaust, and independently controlling the first and second actuators.

5. A method as recited in claim 1, wherein the body of the bifurcation includes at least one internal component duct comprising a communication path for connecting core engine components and wing components, and including forming the flow passage within the body of the bifurcation and around at least a portion of the internal component duct.

6. A nacelle assembly for a gas turbine engine comprising:
   a core nacelle defined about an axis;
   a fan nacelle mounted at least partially around said core nacelle; and
   a pylon mounted to said core nacelle and said fan nacelle, said pylon having a variable area flow system comprising a variable intake and a variable exhaust; said variable intake comprising an adjustable system with multiple louvers; said variable area flow system in communication with a flow passage to control a volume of bypass flow through said pylon and vary flow through a pylon nozzle exit area, said variable area flow system movable toward an open position to increase flow through said pylon nozzle exit area and toward a closed position to decrease flow through said pylon nozzle exit area.

7. The assembly as recited in claim 6, wherein said pylon includes an upper bifurcation.

8. The assembly as recited in claim 6, wherein said pylon includes a lower bifurcation.

9. The assembly as recited in claim 6, wherein said variable area flow system is closed to define a cruise position flow through a fan nozzle exit area.

10. The assembly as recited in claim 6, wherein said flow passage passes through said pylon, said flow passage operable to increase a volume of bypass flow in response to said variable area flow system being in an open position.

11. The assembly as recited in claim 6, wherein said pylon includes at least one bifurcation that includes said variable intake and said variable exhaust with said flow passage comprising an internal passage that is formed within a body of said bifurcation to extend from said variable intake to said variable exhaust.

12. The assembly as recited in claim 11, wherein said variable intake and said variable exhaust are configured to be independently controlled of each other.

13. The assembly as recited in claim 11, including a first actuator associated with said variable intake and a second actuator associated with said variable exhaust, said first and second actuators being independently controlled by a controller.

14. The assembly as recited in claim 11, wherein said multiple louvers have variable heights.

15. The assembly as recited in claim 11, wherein said body of said bifurcation includes at least one internal component duct comprising a communication path for connecting core components and wing components, and wherein said flow passage is formed within said body of said bifurcation and is defined at least partially around said internal component duct.

16. A gas turbine engine comprising:
a core engine defined about an axis;
a gear system driven by said core engine;
a turbofan driven by said gear system about said axis;
a core nacelle defined at least partially about said core engine;
a fan nacelle mounted at least partially around said core nacelle; and a pylon mounted to said core nacelle and said fan nacelle, said pylon having a variable area flow system comprising a variable intake and a variable exhaust; said variable intake comprising an adjustable system with multiple louvers; said variable area flow system in communication with a flow passage to control a volume of bypass flow through said pylon and vary flow through a pylon nozzle exit area, said variable area flow system is movable toward an open position to increase flow through said pylon nozzle exit area and is movable toward a closed position to decrease flow through said pylon nozzle exit area.

17. The engine as recited in claim 16, further comprising a controller in communication with said variable intake and said variable exhaust to control said bypass flow in response to a flight condition.

18. The engine as recited in claim 17, wherein said controller is in communication with said variable area flow system to control said volume of bypass flow in response to a flight condition such that an angle of attack of said turbo fan is maintained generally at a design incidence.

19. The engine as recited in claim 16, wherein said pylon includes at least one bifurcation that includes said variable intake and said variable exhaust with said flow passage comprising an internal passage that is formed within a body of said bifurcation to extend from said variable intake to said variable exhaust.

20. The engine as recited in claim 19, including a first actuator associated with said variable intake and a second actuator associated with said variable exhaust, said first and second actuators being independently controlled by a controller.

21. The engine as recited in claim 19, wherein said adjustable system with multiple louvers comprises a plurality of turning vanes having variable heights relative to each other.

22. The engine as recited in claim 19, wherein said body of said bifurcation includes at least one internal component duct comprising a communication path for connecting core engine components and wing components, and wherein said flow passage is formed within said body of said bifurcation and is defined at least partially around said internal component duct.

\* \* \* \* \*

UNITED STATES PATENT AND TRADEMARK OFFICE
CERTIFICATE OF CORRECTION

PATENT NO. : 8,418,471 B2  
APPLICATION NO. : 12/441546  
DATED : April 16, 2013  
INVENTOR(S) : Constantine Baltas Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

IN THE CLAIMS:

Claim 3, Column 4, line 46: replace "(a) opening" with --closing--

Claim 3, Column 4, line 47: "non-cruise" should read as --cruise--

Signed and Sealed this  
Twenty-fifth Day of June, 2013

Teresa Stanek Rea  
*Acting Director of the United States Patent and Trademark Office*